(12) United States Patent
Li et al.

(10) Patent No.: US 10,724,540 B2
(45) Date of Patent: Jul. 28, 2020

(54) STATOR FOR A GAS TURBINE ENGINE FAN

(71) Applicant: PRATT & WHITNEY CANADA CORP., Longueuil (CA)

(72) Inventors: Yau-Wai Li, Mississauga (CA); Peter Townsend, Mississauga (CA); Ronald Dutton, Guelph (CA); Bernadette Mason, Milton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 754 days.

(21) Appl. No.: 15/370,497

(22) Filed: Dec. 6, 2016

(65) Prior Publication Data
US 2018/0156235 A1 Jun. 7, 2018

(51) Int. Cl.
*F01D 9/04* (2006.01)
*F04D 29/54* (2006.01)
*F02K 3/06* (2006.01)
*F04D 29/66* (2006.01)

(52) U.S. Cl.
CPC .......... *F04D 29/542* (2013.01); *F01D 9/041* (2013.01); *F02K 3/06* (2013.01); *F04D 29/666* (2013.01); *F05D 2230/60* (2013.01)

(58) Field of Classification Search
CPC . F02K 3/06; F01D 9/041; F01D 5/142; F04D 29/542
See application file for complete search history.

(56) References Cited

U.S. PATENT DOCUMENTS

| 3,333,794 A | 8/1967 | Manns |
| 3,610,262 A | 10/1971 | Wise et al. |
| 3,819,008 A | 6/1974 | Evans et al. |
| 3,937,590 A | 2/1976 | Mani |
| 4,076,454 A | 2/1978 | Wennerstrom |
| 4,104,002 A | 8/1978 | Ehrich |
| 4,254,619 A | 3/1981 | Giffin et al. |
| 4,354,346 A | 10/1982 | Wooding |
| 4,354,804 A | 10/1982 | Cruzen |
| 4,844,692 A | 7/1989 | Minkkinen et al. |

(Continued)

FOREIGN PATENT DOCUMENTS

| CN | 101922312 | 12/2010 |
| DE | 102012003902 | 6/2013 |

(Continued)

*Primary Examiner* — Justin D Seabe
(74) *Attorney, Agent, or Firm* — Norton Rose Fulbright Canada LLP

(57) ABSTRACT

A turbofan engine is disclosed having a bypass duct with an asymmetry in aerodynamic profile caused by a local obstruction in the bypass duct. The engine comprises stator vanes circumferentially spaced-apart around a circumference of the bypass duct. A first group of adjacent stator vanes includes a majority of the plurality of stator vanes and are arranged in a first circumferential sector of the bypass duct and have equal stagger angles. A second group of adjacent stator vanes includes a minority of the plurality of stator vanes and are arranged in a second circumferential sector circumferentially positioned relative to the local obstruction. The stator vanes of the second group have stagger angles different from the stagger angles of the stator vanes of the first group.

20 Claims, 5 Drawing Sheets

(56) References Cited

U.S. PATENT DOCUMENTS

| | | | |
|---|---|---|---|
| 5,275,531 A | 1/1994 | Roberts | |
| 5,365,731 A | 11/1994 | Nikkanen et al. | |
| 5,474,417 A | 12/1995 | Privett et al. | |
| 5,489,186 A | 2/1996 | Yapp et al. | |
| 5,607,284 A | 3/1997 | Byrne et al. | |
| 5,628,622 A | 5/1997 | Thore et al. | |
| 5,762,470 A | 6/1998 | Gelmedov et al. | |
| 6,139,259 A * | 10/2000 | Ho | B64C 11/20 415/119 |
| 6,179,551 B1 | 1/2001 | Sathianathan et al. | |
| 6,227,794 B1 | 5/2001 | Wojtyczka et al. | |
| 6,508,624 B2 | 1/2003 | Nadeau et al. | |
| 6,514,039 B1 | 2/2003 | Hand | |
| 6,540,478 B2 | 4/2003 | Fiala et al. | |
| 6,655,632 B1 | 12/2003 | Gupta et al. | |
| 7,118,331 B2 | 10/2006 | Shahpar | |
| 7,444,802 B2 | 11/2008 | Parry | |
| 7,665,964 B2 | 2/2010 | Taylor et al. | |
| 7,797,944 B2 | 9/2010 | Morford et al. | |
| 7,861,823 B2 | 1/2011 | Prasad et al. | |
| 7,914,251 B2 | 3/2011 | Pool et al. | |
| 8,046,915 B2 | 11/2011 | Xie et al. | |
| 8,186,942 B2 | 5/2012 | Haas | |
| 8,366,047 B2 | 2/2013 | Euvino, Jr. et al. | |
| 8,403,624 B2 | 3/2013 | Xie et al. | |
| 8,461,713 B2 | 6/2013 | Sammy | |
| 8,540,490 B2 * | 9/2013 | Rannakrishnan | F01D 5/146 416/1 |
| 8,636,464 B2 | 1/2014 | Bottome | |
| 8,756,909 B2 | 6/2014 | Avery | |
| 9,091,174 B2 * | 7/2015 | Bagnall | F01D 5/141 |
| 2011/0164967 A1 | 7/2011 | Elorza Gomez et al. | |
| 2012/0087787 A1 | 4/2012 | Brown | |
| 2012/0240594 A1 | 9/2012 | Shamara | |
| 2012/0263587 A1 | 10/2012 | Hergt et al. | |
| 2013/0045370 A1 | 2/2013 | Aho et al. | |
| 2013/0153456 A1 | 6/2013 | Zhu et al. | |
| 2013/0202424 A1 | 8/2013 | Lussier et al. | |
| 2013/0266439 A1 | 10/2013 | Rubak et al. | |
| 2014/0010638 A1 | 1/2014 | Perrot | |
| 2014/0030071 A1 | 1/2014 | Leslie et al. | |
| 2014/0219792 A1 * | 8/2014 | Topol | F01D 17/162 415/211.2 |
| 2014/0286768 A1 | 9/2014 | Boniface et al. | |
| 2015/0260051 A1 | 9/2015 | Gallagher et al. | |
| 2016/0084162 A1 | 3/2016 | Abrari et al. | |
| 2016/0084265 A1 | 3/2016 | Yu et al. | |
| 2016/0844162 | 3/2016 | Abrari et al. | |
| 2016/0186690 A1 | 6/2016 | Florea et al. | |
| 2016/0312618 A1 | 10/2016 | Macchia | |
| 2016/0312641 A1 | 10/2016 | Macchia | |
| 2017/0145840 A1 | 5/2017 | Di Mare et al. | |
| 2017/0145959 A1 | 5/2017 | Baralon | |
| 2017/0147741 A1 | 5/2017 | Di Mare et al. | |
| 2017/0152861 A1 | 6/2017 | Japikse | |
| 2017/0248156 A1 | 8/2017 | Parker et al. | |
| 2018/0156235 A1 | 6/2018 | Li et al. | |

FOREIGN PATENT DOCUMENTS

| | | |
|---|---|---|
| EP | 1956247 | 8/2008 |
| GB | 623142 | 5/1949 |
| GB | 2405184 | 2/2005 |
| JP | 2000095195 | 4/2000 |
| WO | 9809066 | 3/1998 |
| WO | 02/29224 | 4/2002 |
| WO | 20140023891 | 2/2014 |

\* cited by examiner

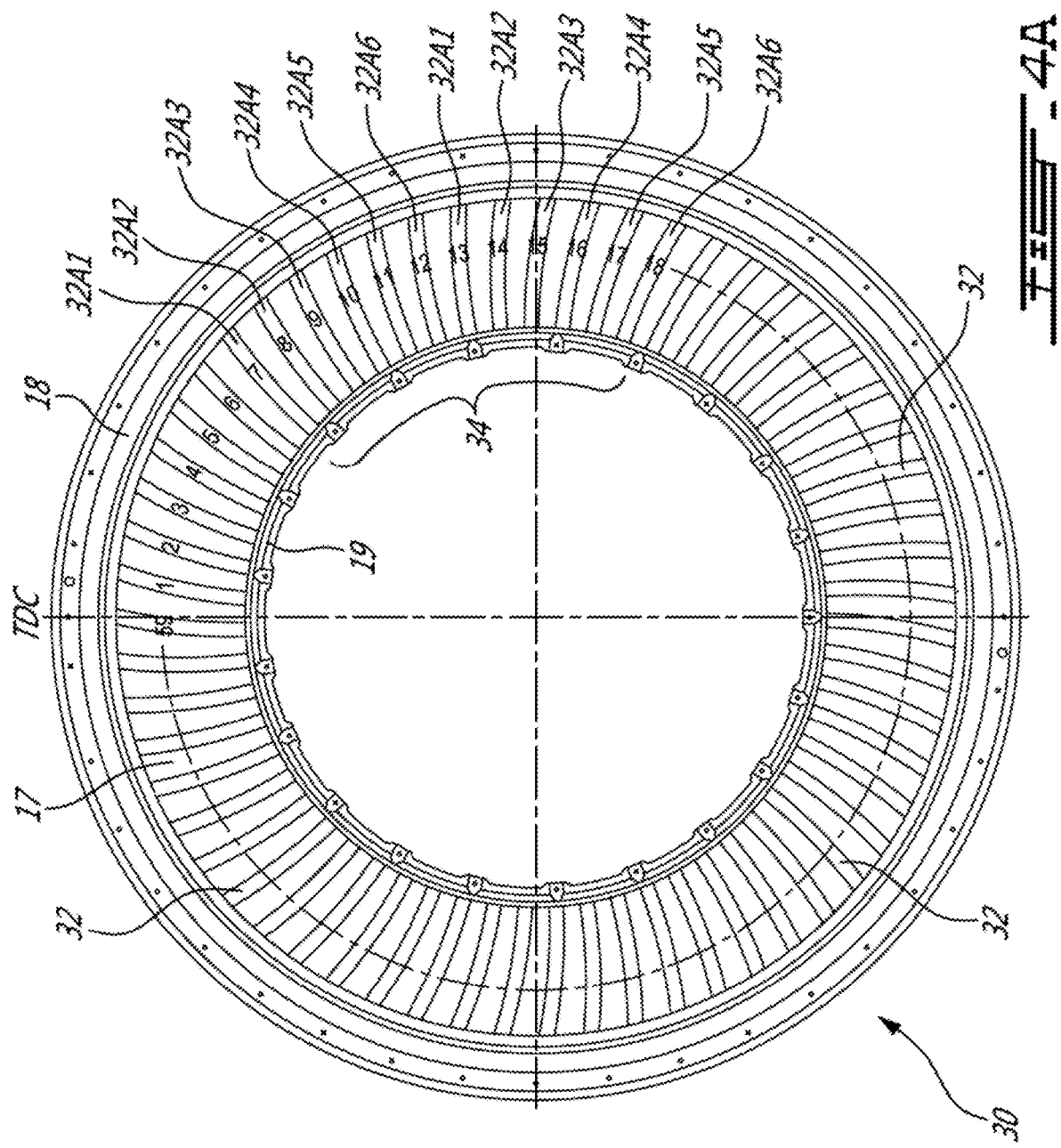

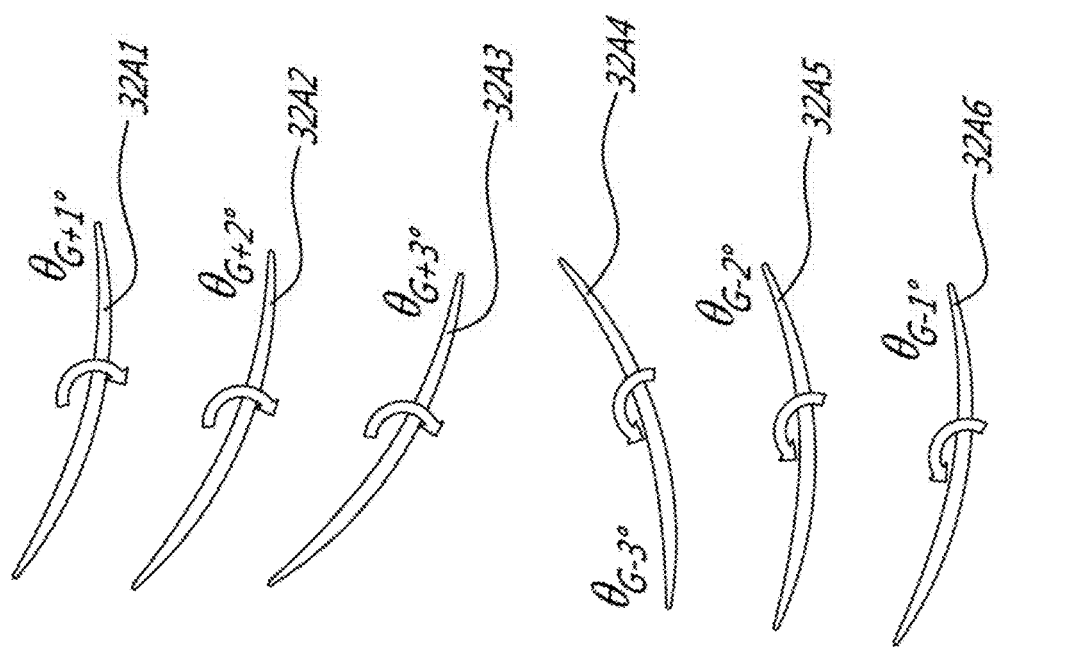

STATOR FOR A GAS TURBINE ENGINE FAN

TECHNICAL FIELD

The application relates generally to stators for gas turbine engines, and more particularly, to fan stators for fans of gas turbine engines.

BACKGROUND

Turbofan gas turbine engines may have disruptions in the flow through the bypass duct, such as may be caused by accessories that project into the bypass duct flow path. These accessories encounter the airflow in the bypass duct and thus form partial obstructions to the bypass airflow through the bypass duct. The obstruction of the airflow by these accessories can cause static back pressure in the bypass air flow. This static back pressure may cause vibratory stress on the upstream stationary stators of the fan, and on the fan itself.

SUMMARY

There is accordingly provided a turbofan engine having a fan and a casing defining a bypass duct having an asymmetry in aerodynamic profile caused by a local obstruction in the bypass duct, the local obstruction in use causing an asymmetric back pressure on the fan, the engine comprising: a plurality of stator vanes circumferentially spaced-apart around a circumference of the bypass duct intermediate the fan and the local obstruction, a first group of adjacent stator vanes including a majority of the plurality of stator vanes and a second group of adjacent stator vanes including a minority of the plurality of stator vanes, the stator vanes of the first group arranged in a first circumferential sector of the bypass duct and having equal stagger angles, the stator vanes of the second group arranged in a second circumferential sector being circumferentially positioned relative to the local obstruction, the stator vanes of the second group having stagger angles different from the stagger angles of the stator vanes of the first group.

There is also provided a gas turbine engine, comprising: a radially outer fan casing and a radially inner shroud, a bypass duct being defined between the fan casing and the shroud; a fan having a hub and a plurality of fan blades extending radially outwardly from the hub, the fan blades directing air through the bypass duct during operation of the gas turbine engine; a local obstruction disposed in the bypass duct downstream of the fan blades, the local obstruction encountering the air directed through the bypass duct during operation of the gas turbine engine and generating an asymmetric back pressure on the fan; and a stator disposed intermediate the fan blades and the local obstruction, the stator having a plurality of stator vanes circumferentially spaced-apart around a circumference of the bypass duct, a first group of adjacent stator vanes including a majority of the plurality of stator vanes and a second group of adjacent stator vanes including a minority of the plurality of stator vanes, the stator vanes of the first group arranged in a first circumferential sector of the bypass duct and having equal stagger angles, the stator vanes of the second group arranged in a second circumferential sector being circumferentially positioned relative to the local obstruction, the stator vanes of the second group having stagger angles different from the stagger angles of the stator vanes of the first group.

There is further provided a method of assembling a stator for a fan of a gas turbine engine, comprising: positioning a plurality of stator vanes circumferentially spaced-apart within a bypass duct upstream of a local obstruction within the bypass duct, the local obstruction generating an asymmetric back pressure on the fan; selecting a group of the plurality of stator vanes, the stator vanes of the group including at least two circumferentially-adjacent stator vanes and less than half of the stator vanes; and providing the stator vanes of the group with stagger angles different from stagger angles of the remaining stator vanes, the stagger angles of the remaining stator vanes being equal.

DESCRIPTION OF THE DRAWINGS

Reference is now made to the accompanying figures in which:

FIG. 4A is a front view of fan stator vanes of the gas turbine engine of FIG. 1; and FIG. 4B is a schematic illustration of stagger angles of a group of the stator vanes of FIG. 4A.

DETAILED DESCRIPTION

Figure 1:
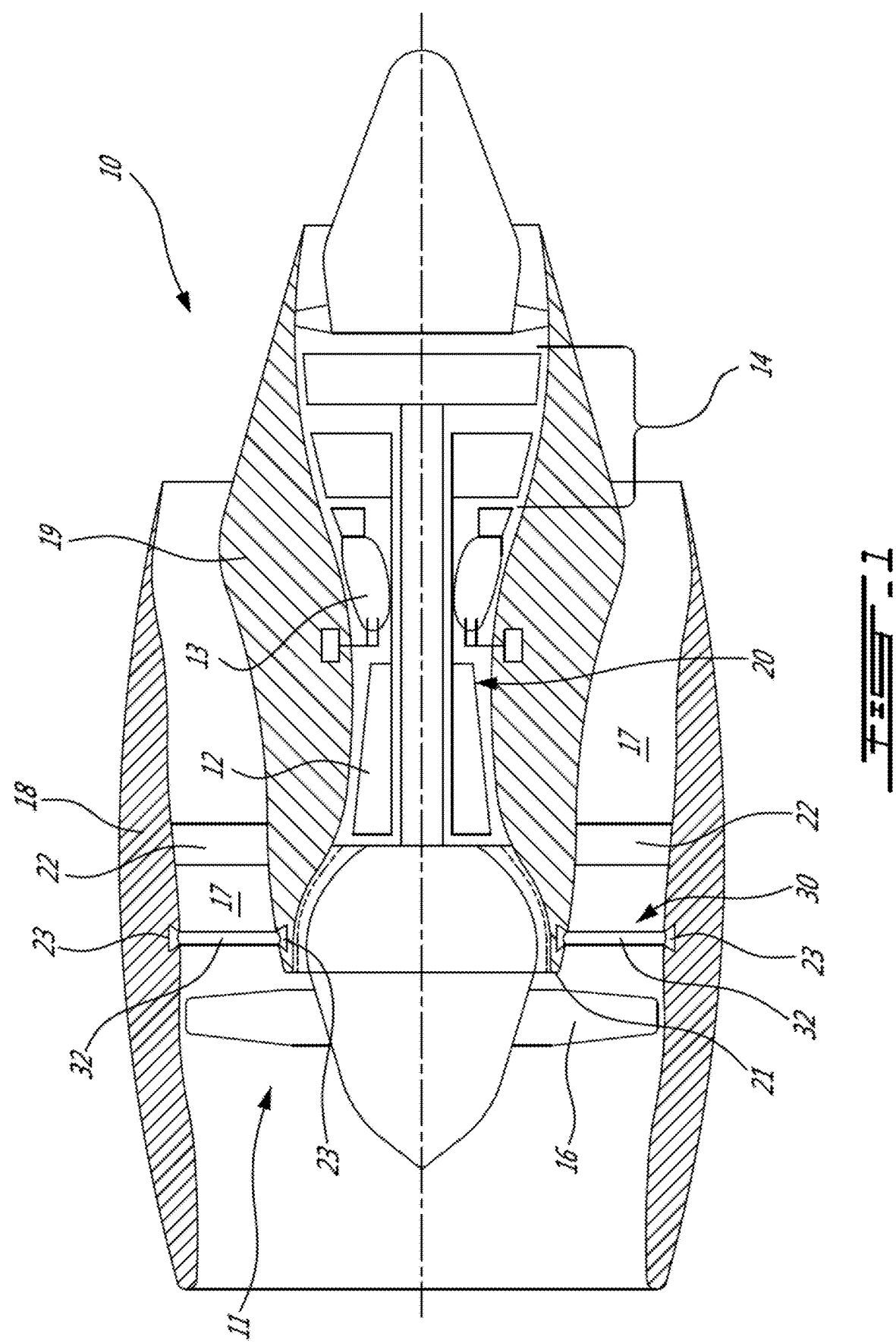
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 11 through which ambient air is propelled, a compressor section 12 for pressurizing the air, a combustor 13 in which the compressed air is mixed with fuel and ignited for generating an annular stream of hot combustion gases, and a turbine section 14 for extracting energy from the combustion gases.

The fan 11 has a central hub with a plurality of rotatable fan blades 16. During operation of the turbofan engine 10, the fan blades 16 propel the ambient air into a bypass duct 17 defined between a radially outer fan casing 18 and a radially inner shroud 19, and also propel the ambient air into a core 20 of the turbomachinery of the turbofan engine 10. More particularly, a flow splitter 21 splits the pressurized airflow provided by the fan blades 16 into a radially inner or "core" stream channeled through the turbomachinery, and a radially outer or "bypass" stream channeled through the bypass duct 17.

One or more engine components downstream of the fan blades 16 may create one or more local obstructions 22 to the airflow in the bypass duct 17. In the depicted embodiment, the obstruction 22 is a radial fan strut. The obstruction 22 can also include other types of engine components downstream of the fan blades 16 that protrude into the bypass duct 17 and encounter the bypass airflow. Examples of such other downstream components include, but are not limited to, pylons, coolers or other heat exchangers, and an integrated drive generator (IDG). During at least some operating conditions of the engine 10, the obstruction 22 may generate a back pressure which affects components upstream of the obstruction 22. Undesirably, the back pressure generated by the obstruction 22 may cause vibratory stresses on stationary upstream components, such as a stator 30 of the fan 11, and on rotating upstream components such as the fan blades 16.

The presence of the obstruction 22 within the bypass duct 17 modifies the aerodynamic profile of the airflow through the bypass duct 17. More particularly, the obstruction 22 may introduce an asymmetry in the aerodynamic profile, such that the aerodynamic profile of the airflow about the circumference of the bypass duct 17 is not equal because of the local obstruction 22. The asymmetry in the aerodynamic profile is generally circumferentially aligned, or "clocked", with the obstruction 22. In some instances, however, the asymmetry in the aerodynamic profile may be circumferentially offset from the obstruction 22 because of the swirl introduced into the airflow by the rotating fan blades 16.

It is also understood that in a conventional turbofan engine, the local obstruction in the bypass duct may cause an asymmetric back pressure on upstream components, such as the fan. The asymmetric back pressure is a back pressure generated by the obstruction that varies about the circumference of the bypass duct. This asymmetry in the back pressure may affect the performance of the upstream fan blades as well as the stall margin of the engine. Asymmetric back pressure may also cause dynamic excitation of the fan blades. One technique for determining the location of the asymmetric back pressure is by measuring the level of pressure variation at different circumferential points at the exit of the fan. One possible technique for determining an acceptable level of pressure variation at the exit of the fan involves defining the pressure variation in terms of a static pressure coefficient: $Cp=(P_{static}-P_{static}\text{ average})/(0.5 \rho V^2)$. A significant obstruction can be one that raises the local static pressure at the fan exit by 1% relative to the average static pressure level at the fan exit. The stator 30 disclosed herein may help to mitigate the effect of unacceptable levels of pressure variation by helping to make the airflow at the fan exit more uniform about the circumference of the bypass duct.

The stator 30 of the fan 11 is mounted within the bypass duct 17 upstream of the obstruction 22 and downstream of the fan blades 16. The stator 30 has a plurality of stationary stator vanes 32 extending radially outwardly from the shroud 19 or other central hub. The stator vanes 32 extend through the bypass duct 17 between the shroud 19 and the fan casing 18 and are circumferentially spaced-apart from each other throughout the annular bypass duct 17. Each stator vane 32 may be removably inserted between the shroud 19 and the fan casing 18. More particularly, each of the shroud 19 and the fan casing 18 have circumferentially spaced-apart mounting slots 23. Each mounting slot 23 is an aperture or groove within one of the shroud 19 or fan casing 18 that is positioned and shaped to receive a correspondingly shaped hub portion or tip portion of one of the stator vanes 32 at its particular circumferential position about the stator 30.

Figure 2:
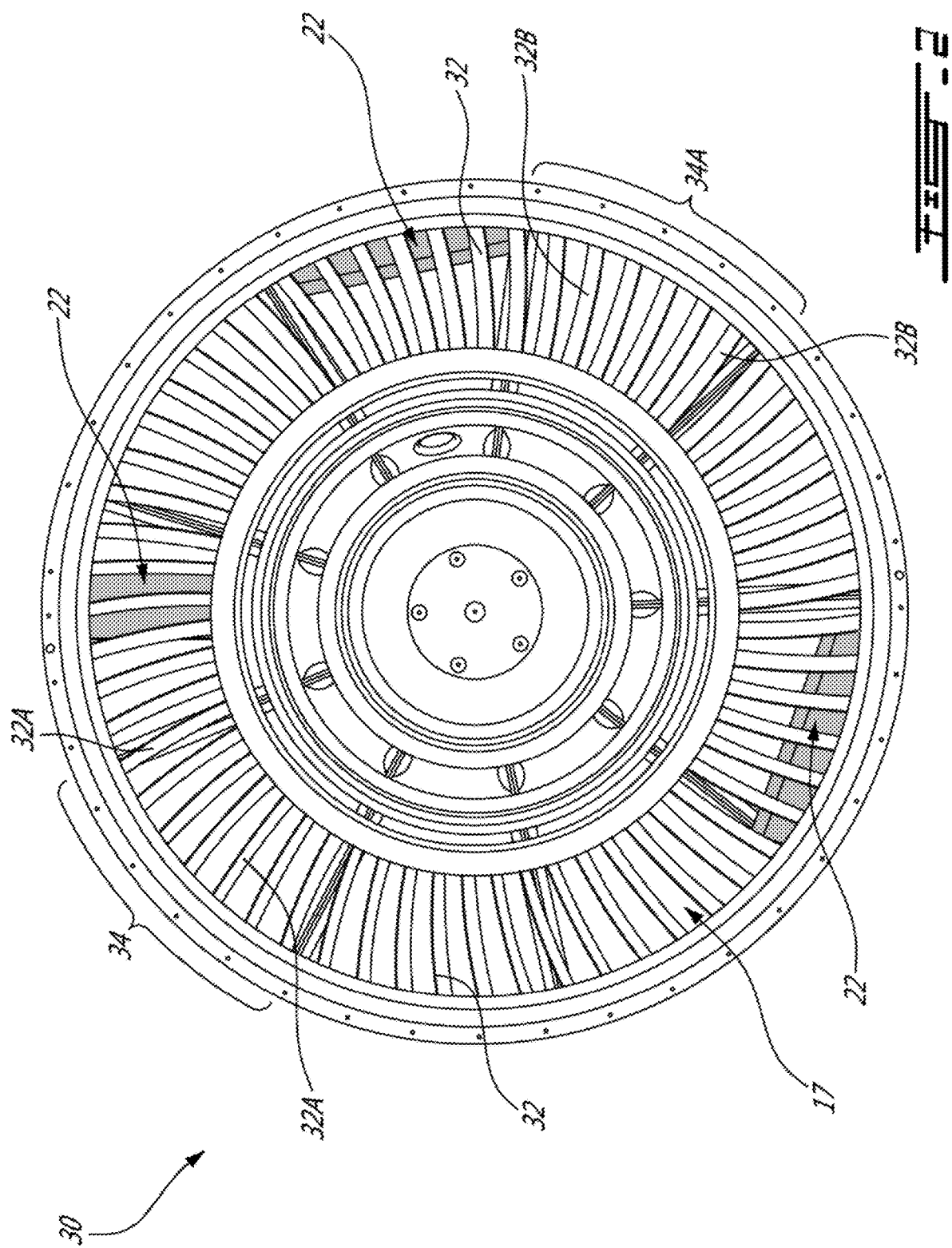
FIG. 2 is a front view of the gas turbine engine of FIG. 1.
Figure 3:
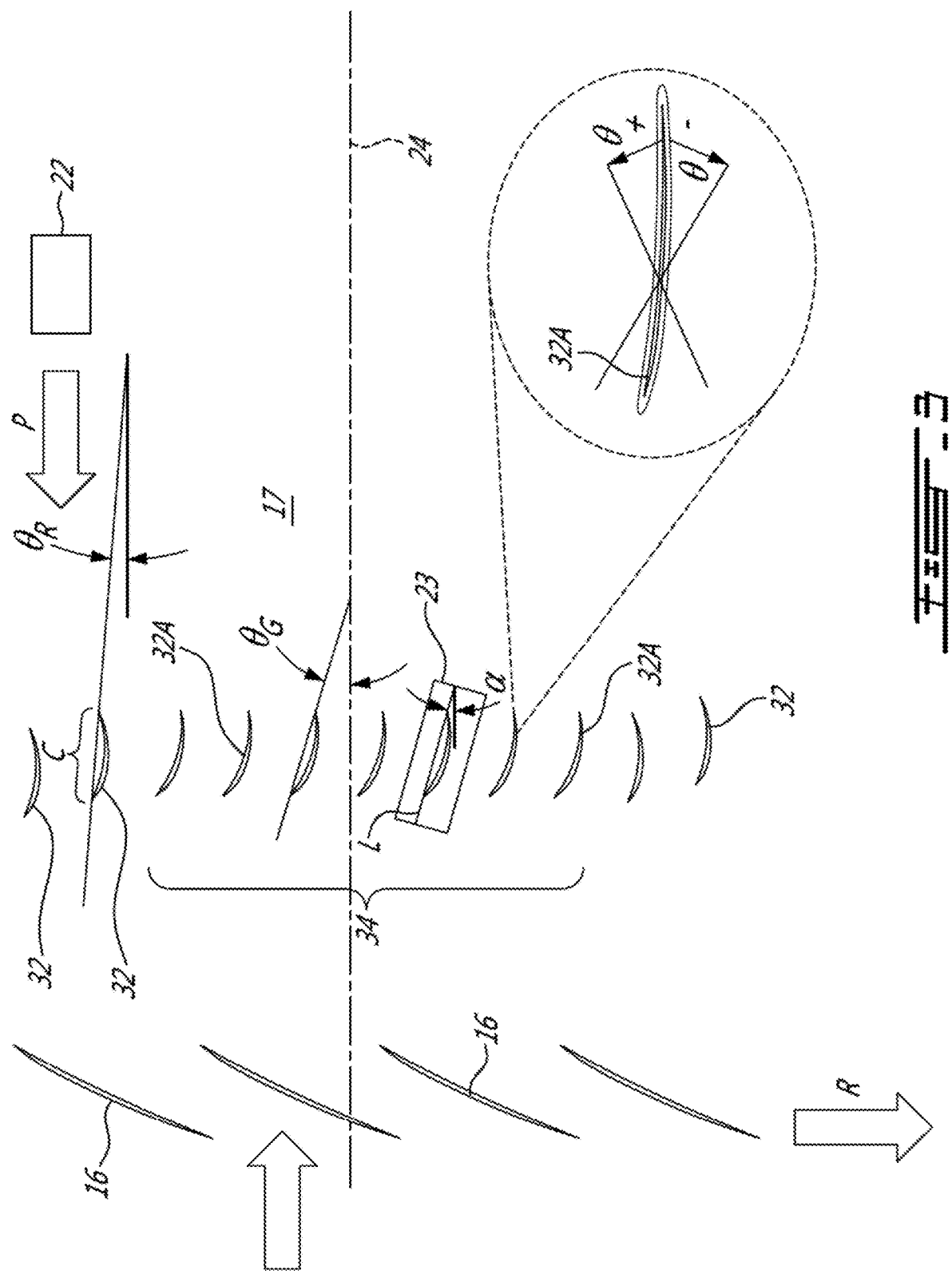
FIG. 3 is a partial schematic illustration of a fan of the gas turbine engine of FIG. 1, showing components of the fan and a downstream obstruction.

Referring to now FIGS. 2 and 3, the orientation of a discrete and specific number of the stator vanes 32, as defined by their stagger angles $\Theta$, is modified to reduce the effect of the asymmetric back pressure P generated by the downstream obstruction 22 on the fan 11. The majority of the stator vanes 32 are part of a first group of stator vanes 32, the "majority" being defined by fifty percent (50%) of all the stator vanes 32, plus at least one more stator vane 32. The stagger angles $\Theta$ of the majority of the stator vanes 32 of the first group are identical. A different, second group 34 of stator vanes 32A is defined by two or more circumferentially-adjacent or neighboring stator vanes 32, but not all of the stator vanes 32. The stator vanes 32A of the second group 34 form a discrete number of stator vanes 32A that have, by design, different stagger angles $\Theta$ than the adjacent and remaining stator vanes 32 of the first group to mitigate the effects of the asymmetric back pressure P. It therefore follows that the number of stator vanes 32A in the second group 34 is greater than two but less than 50% of the total number of stator vanes 32.

The stator vanes 32A of the second group 34 are positioned relative to a circumferential location of the downstream obstruction 22. In the depicted embodiment of FIGS. 2 and 3, the stator vanes 32A of the second group 34 are circumferentially offset from the obstruction 22. More particularly, the stator vanes 32A of the second group 34 extend over a second circumferential sector that is offset from the circumferential extent of the obstruction 22 and axially upstream therefrom. Therefore, the stator vanes 32A of the second group 34 are restricted to a particular sector of the circumference of the stator 30 where there is no circumferentially-aligned downstream obstruction 22.

In their circumferentially-offset position, the stator vanes 32A of the second group 34 are generally aligned with a location of the asymmetric back pressure P caused by the local obstruction 22. During at least some operating conditions of the engine, the asymmetric back pressure P is not circumferentially aligned with the local obstruction 22. The circumferential alignment of stator vanes 32A with circumferential sectors of anticipated back pressure P helps to make the pattern of back pressure P approaching the fan blades 16 more uniform. The stator vanes 32A with their different stagger angles $\Theta$ helps to form additional localized areas of higher back pressure in front of the stator vanes 32A. When this localized back pressure is added to the asymmetric back pressure P pattern created by the obstruction 22, the pattern of back pressure P approaching the fan blades 16 may become more uniform, and may therefore contribute to reducing the dynamic excitation of the fan blades 16. The circumferential offset of the stator vanes 32A of the second group 34 relative to the downstream bypass duct obstruction 22, as well as the different stagger angles $\Theta$ of the stator vanes 32A of the second group 34, may also help to reduce the static back pressure P generated by the obstruction 22 in the bypass duct 17 downstream of the fan blades 16 when they rotate in direction R.

In the embodiment of FIG. 2, two or more circumferentially-adjacent remaining stator vanes 32B define a third group 34A of stator vanes 32. The stator vanes 32B of the third group 34A are circumferentially adjacent to a second obstruction 22 different from the other obstructions 22. Similar to the stator vanes 32A of the second group 34, the stator vanes 32B of the third group 34A have stagger angles $\Theta$ that are different from those of the adjacent and remaining majority stator vanes 32 of the first group. In alternate embodiments, the stator 30 has more than two groups 34 of stator vanes 32. For a particular stator operating within particular flow conditions, computational fluid dynamics (CFD) suggested that adding a third staggered group 34A of stator vanes 32B at another circumferential location helps to further modulate the flow and smooth out the circumferential static pressure distribution of the stator. This may help to reduce the effect of the back pressure P generated by the downstream obstructions 22 on the stator vanes 32 and/or the fan 11.

The selection of the stator vanes 32 to form into groups 34 is based on the anticipated aerodynamic effect of the downstream obstruction 22 on upstream components. Regarding the aerodynamic stress caused to the stator 30, the downstream obstruction 22 may divert some of the air passing through the bypass duct 17 to areas through the stator 30 where there are no obstructions 22. It is believed that this additional air increases the flow velocity through the stator vanes 32 that are not circumferentially aligned with the obstruction 22, which may cause dynamic instability leading to stresses. The stator vanes 32A may therefore be included in the second group 34 so as to reduce the flow therethrough. The reduced flow caused by the staggered stator vanes 32A may help to offset this effect and reduce the dynamic stresses. The above-described technique for determining an acceptable level of pressure variation at the exit of the fan 11 may provide a threshold value of pressure variation. A pressure variation value that is determined to be above this threshold value can serve as a design factor for choosing which of the plurality stator vanes 32 to include in the second group 34.

Referring to FIG. 3, the stagger angle $\Theta$ is a measure of the orientation of each stator vane 32 about its span-wise axis. The stagger angle $\Theta$ is defined between the chord line C of each stator vane 32 and the axial direction, represented here by the longitudinal center axis 24 of the gas turbine engine or a line parallel thereto. The stagger angle $\Theta$ can be positive or negative. A positive stagger angle $\Theta$ indicates that the stator vane 32 is oriented in a first direction, and a negative stagger angle $\Theta$ indicates that the stator vane 32 is oriented in a second direction opposite to the first direction. Adjusting the stator vane 32 along the first and second directions orients the stator vane 32 into an "open" and "closed" position. The stator vane 32 allows greater airflow therethrough in the open position relative to when the stator vane 32 is in the closed position.

For the sole purpose of simplifying the explanation of the stagger angle $\Theta$, all the stator vanes 32A of the second group 34 in FIG. 3 are shown having the same stagger angles $\Theta_G$. In alternate embodiments, and as described in greater detail below, one or more of the stator vanes 32A of the second group 34 can have a stagger angle $\Theta_G$ that differs from the stagger angle $\Theta_G$ of another stator vane 32A of the second group 34. The majority stator vanes 32 of the first group outside of the second group 34 have equal stagger angles $\Theta_R$. The difference between the stagger angle $\Theta_G$ of a stator vane 32A of the second group 34 and the stagger angle $\Theta_R$ of the majority stator vanes 32 of the first group is known as the stagger variation. The stagger variation can be positive or negative, and is often expressed as a magnitude.

The angular misalignment of the stator vanes 32A of the second group 34 relative to those outside the second group 34 is achieved by orienting the stator vanes 32A differently from the stator vanes 32. More particularly, the stator vanes 32A of the second group 34 have stagger angles $\Theta_G$ that are different from the equal stagger angles $\Theta_R$ of the stator vanes 32 of the first group. Varying the stagger angles $\Theta_G$ of only those stator vanes 32A in the circumferential vicinity of the obstruction 22 helps to equalize flow around the entire circumference of the stator 30 by evening out local flow disturbances upstream of the obstruction 22. This helps to reduce the effect of the downstream obstruction 22 on the fan 11 and its components.

In contrast, some conventional fan stators vary the stagger and/or camber angle of each and every one of the stator vanes of the stator. In such stators, the stagger and camber angles vary across the full circumferential span of the stator. The magnitude of the stagger and/or camber variation between two circumferentially-adjacent stator vanes of such a stator is therefore never zero. Creating such a stator may involve providing a distinct airfoil having a unique stagger and/or camber angle for each stator vane. This is not ideal because each differently staggered and/or cambered stator vanes will have a unique part number, which increases the number of engine parts and the complexity related to tracking these parts and maintaining them. Alternatively, the stagger angle of each stator vane can be varied by machining distinct mounting slots for each stator vane. It will be appreciated that such customisation imposes high labour and financial costs for assembling the stator of the fan. Furthermore, it is observed that varying the stagger and/or camber angle of all the stator vanes is often not necessary for obstructions that generate upstream aerodynamic disturbances because these are often highly localized.

In the embodiment of FIG. 3, each mounting slot 23 of the stator vanes 32A of the second group 34 has an orientation angle $\alpha$ that is substantially equal to the stagger angles $\Theta_G$ of the stator vanes 32A of the second group 34. The orientation angle $\alpha$ of the mounting slot 23 is defined between a line L extending between axially-opposed ends of the mounting slot 23 and the axial direction, represented here by the longitudinal center axis 24 of the gas turbine engine or a line parallel thereto. When a stator vane 32A of the second group 34 is positioned within a corresponding mounting slot 23 that is oriented along the orientation angle $\alpha$, the stator vane 32A is automatically oriented to have the desired stagger angle $\Theta_G$. Stated differently, the stagger angle $\Theta_G$ of each stator vane 32A of the second group 34 is achieved by forming a corresponding mounting slot 23 to have the same orientation angle $\alpha$ value. Since the desired angular misalignment is achieved at the level of the mounting slot 23, generic and identical airfoils for the stator vanes 32 can be used for the entire stator 30. This reduces the amount of part numbers, thereby simplifying the task of tracking parts of the engine and maintaining them. The use of identical stator vanes 32 with identical airfoils, as opposed to a custom-designed stator vane for each circumferential position, also allows for economies of scale when manufacturing the stator vanes 32. Similarly, the circumferential spacing between the stator vanes 32 can remain unchanged. It will thus be appreciated that effecting the desired stagger angle $\Theta_G$ in a structural component of the stator 30 is less complex and cheaper than affecting the desired stagger angle $\Theta_G$ at the level of each stator vane 32.

Referring to FIGS. 4A and 4B, the stagger angles $\Theta_G$ of the stator vanes 32A of the second group 34 are not the same for all the stator vanes 32A, such that the stagger angle $\Theta_G$ of one or more of the stator vanes 32A of the second group 34 is different from that of at least another stator vane 32A of the second group 34. Similarly, the magnitude and direction of the stagger angles $\Theta_G$ varies, and is selected to reduce the static back pressure generated by the obstruction 22 in the bypass duct 17. One possible range for the magnitude of the stagger angles $\Theta_G$ is between 0° and 4.5°. The stagger angles $\Theta_G$ can be as large as ±4.5°.

The stagger angle $\Theta_G$ of at least one of the stator vanes 32A of the second group 34 is positive, and the stagger angle $\Theta_G$ of at least another one of the stator vanes 32A of the group is negative. In the depicted embodiment, twelve stator vanes 32A make up the second group 34. The mounting slots of the outer fan casing 18 and inner shroud 19 is modified to define the stagger angles $\Theta_G$ of these twelve stator vanes 32A, while a majority of the stator vanes 32 of the total fifty-nine stator vanes 32 have the same stagger angles $\Theta_R$ that is different from the stagger angles $\Theta_G$.

In the depicted embodiment, the magnitude of the stagger angles $\Theta_G$ is smallest for the peripheral stator vanes 32A at the circumferential periphery of the second group 34, and increases for the central stator vanes 32A that are circumferentially inwardly from the peripheral stator vanes 32A. This gradual staggering of the stator vanes 32A of the group from least staggered at the outer circumference of second group 34 to more staggered circumferentially inward therefrom eases the transition between the stator vanes 32A of the second group 34 and the majority of stator vanes 32 outside the second group 34 on either side thereof.

Still referring to FIGS. 4A and 4B, the pattern of stagger angles $\Theta_G$ repeats itself. More particularly, the stagger angle $\Theta_G$ for the stator vane 32A1 is +1°, the stagger angle $\Theta_G$ for the stator vane 32A2 is +2°, and the stagger angle $\Theta_G$ for the stator vane 32A3 is +3°. The stagger angle $\Theta_G$ for the stator vane 32A4 is −3°, the stagger angle $\Theta_G$ for the stator vane 32A5 is −2°, and the stagger angle $\Theta_G$ for the stator vane 32A6 is −1°. A positive stagger angle $\Theta_G$ indicates that the stator vane 32A is oriented in an "open" position to allow greater airflow therethrough relative to when the stator vane 32A is in a "closed" position, where the closed position is indicated by a negative stagger angle $\Theta_G$. The negative and positive convention used for the stagger angles $\Theta_G$ described herein can be reversed.

Therefore, in the depicted embodiment, the twelve stator vanes 32A of the second group 34 are "open, open, open, closed, closed, closed, open, open, open, closed, closed, and closed". For a particular stator operating within particular flow conditions, it was observed that this distribution of stagger angles $\Theta_G$ amongst the stator vanes 32A of the second group 34 helps to equalize the back pressure on the stator 30 with minimum increase in loss. It will be appreciated that the stator vanes 32 of the stator 30, and in particular the stator vanes 32A of the second group 34, can be staggered at any desired angle, depending on the flow conditions of the particular gas turbine engine being used, and depending on the specific stress distribution on the stator vanes 32 and/or the fan 11 caused by downstream obstruction 22, amongst other factors.

Still referring to FIGS. 2 and 3, there is also disclosed a method of assembling a stator 30 for a fan of a gas turbine engine. The method includes positioning the circumferentially spaced-apart stator vanes 32 within the bypass duct 17 upstream of the obstruction 22. The method also includes selecting at least two circumferentially-adjacent stator vanes 32A to define the second group 34 of stator vanes 32. The method also includes orienting the stator vanes 32A to have stagger angles $\Theta_G$ different from the same stagger angles $\Theta_R$ of the remaining stator vanes 32. Prior to selecting the stator vanes 32A of the second group 34, in an embodiment, the method includes analysing computationally the back pressure to be generated by the obstruction 22.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A turbofan engine having a fan and a casing defining a bypass duct having an asymmetry in aerodynamic profile caused by a local obstruction in the bypass duct, the local obstruction in use causing an asymmetric back pressure on the fan, the engine comprising: a plurality of stator vanes circumferentially spaced-apart around a circumference of the bypass duct intermediate the fan and the local obstruction, a first group of circumferentially-adjacent stator vanes including a majority of the plurality of stator vanes and a second group of circumferentially-adjacent stator vanes including a minority of the plurality of stator vanes, the stator vanes of the first and second groups having a same axial position along an axis of the engine, the stator vanes of the first group arranged in a first circumferential sector of the bypass duct and having equal stagger angles, the stator vanes of the second group arranged in a second circumferential sector being circumferentially positioned relative to the local obstruction, the stator vanes of the second group having stagger angles different from the stagger angles of the stator vanes of the first group.

2. The turbofan engine as defined in claim 1, wherein the stator vanes of the second group arranged in the second circumferential sector are aligned with a location of the asymmetric back pressure caused by the local obstruction.

3. The turbofan engine as defined in claim 1, wherein each stator vane is insertable between a radially inner shroud and a radially outer fan casing of the fan, the stator vanes of the second group being disposed along circumferential segments of the shroud and fan casing corresponding to the second circumferential sector, each circumferential segment having circumferentially spaced-apart mounting slots therein corresponding to positions of the stator vanes, each mounting slot having an orientation angle being equal to the stagger angles of the stator vanes of the second group.

4. The turbofan engine as defined in claim 3, wherein the stator vanes have identical airfoils.

5. The turbofan engine as defined in claim 1, wherein the second circumferential sector is circumferentially offset from the local obstruction.

6. The turbofan engine as defined in claim 1, wherein the stagger angles of the stator vanes of the second group are equal.

7. The turbofan engine as defined in claim 1, wherein the stagger angles of the stator vanes of the second group are unequal.

8. The turbofan engine as defined in claim 7, wherein the stator vanes of the second group include peripheral stator vanes and at least one central stator vane disposed between the peripheral stator vanes, the at least one central stator vane having a greater magnitude stagger angle than the stagger angles of the peripheral vanes.

9. The turbofan engine as defined in claim 7, wherein at least one of the stator vanes of the second group has a stagger angle orienting said stator vane in a first direction, and at least another one of the stator vanes of the second group having a stagger angle orienting said stator vane in a second direction opposite to the first orientation.

10. The turbofan engine as defined in claim 1, wherein the plurality of stator vanes further comprises a third group of stator vanes having at least two circumferentially-adjacent stator vanes arranged in a third circumferential sector of the bypass duct, the second and the third groups of stator vanes including a minority of the plurality of stator vanes, the stator vanes of the third group being circumferentially aligned with a location of asymmetric back pressure caused by a second local obstruction in the bypass duct, the stator vanes of the third group having stagger angles different from the stagger angles of the stator vanes of the first group.

11. A gas turbine engine, comprising:
a radially outer fan casing and a radially inner shroud, a bypass duct being defined between the fan casing and the shroud;
a fan having a hub and a plurality of fan blades extending radially outwardly from the hub, the fan blades directing air through the bypass duct during operation of the gas turbine engine;
a local obstruction disposed in the bypass duct downstream of the fan blades, the local obstruction encountering the air directed through the bypass duct during operation of the gas turbine engine and generating an asymmetric back pressure on the fan; and a stator disposed intermediate the fan blades and the local obstruction, the stator having a plurality of stator vanes circumferentially spaced-apart around a circumference of the bypass duct, a first group of circumferentially-adjacent stator vanes including a majority of the plurality of stator vanes and a second group of circumferentially-adjacent stator vanes including a minority of the plurality of stator vanes, the stator vanes of the first and second groups having a same axial position along an axis of the engine, the stator vanes of the first group arranged in a first circumferential sector of the bypass duct and having equal stagger angles, the stator vanes of the second group arranged in a second circumferential sector being circumferentially positioned relative to the local obstruction, the stator vanes of the second group having stagger angles different from the stagger angles of the stator vanes of the first group.

12. The gas turbine engine of claim 11, wherein the stator vanes of the second group arranged in the second circumferential sector are aligned with a location of the asymmetric back pressure caused by the local obstruction.

13. The gas turbine engine as defined in claim 11, wherein the stator vanes of the second group are disposed along circumferential segments of the shroud and the fan casing corresponding to the second circumferential sector, each circumferential segment having circumferentially spaced-apart mounting slots therein for receiving the stator vanes of the second group, each mounting slot having an orientation angle being equal to the stagger angles of the stator vanes of the second group.

14. The gas turbine engine as defined in claim 13, wherein the stator vanes have identical airfoils.

15. The gas turbine engine as defined in claim 11, wherein the stagger angles of the stator vanes of the second group are unequal.

16. The gas turbine engine as defined in claim 15, wherein the stator vanes of the second group include peripheral stator vanes and at least one central stator vane disposed between the peripheral stator vanes, the at least one central stator vane having a greater magnitude stagger angle than the stagger angles of the peripheral vanes.

17. A method of assembling a stator for a fan of a gas turbine engine, comprising:

positioning a plurality of stator vanes at a same axial position along an axis of the engine and circumferentially spaced-apart within a bypass duct upstream of a local obstruction within the bypass duct, the local obstruction generating an asymmetric back pressure on the fan;

selecting a group of the plurality of stator vanes, the stator vanes of the group including at least two circumferentially-adjacent stator vanes and less than half of the stator vanes; and providing the stator vanes of the group with stagger angles different from stagger angles of the remaining stator vanes, the stagger angles of the remaining stator vanes being equal.

18. The method as defined in claim 17, further comprising determining computationally the asymmetric back pressure to be generated by the local obstruction before selecting the at least two circumferentially-adjacent stator vanes of the group.

19. The method as defined in claim 17, further comprising aligning the stator vanes of the group with a location of the asymmetric back pressure caused by the local obstruction.

20. The method as defined in claim 17, wherein providing the stator vanes of the group includes selecting the stagger angles of the stator vanes of the group to reduce the asymmetric back pressure generated by the local obstruction in the bypass duct.

* * * * *